July 30, 1957     K. R. PIKE     2,800,809

INDUCTION HARDENED CRANKPINS

Filed Sept. 4, 1953

INVENTOR.
KENNETH R. PIKE
BY John W. Michael
ATTORNEY

United States Patent Office 2,800,809
Patented July 30, 1957

2,800,809
INDUCTION HARDENED CRANKPINS

Kenneth R. Pike, Hartford, Wis., assignor to West Bend Aluminum Co., West Bend, Wis., a corporation of Wisconsin Application September 4, 1953, Serial No. 378,651

3 Claims. (Cl. 74—595)

This invention relates to improvements in induction hardened journals such as pins of crankshafts, and particularly to such crankshafts adapted for use with needle bearings.

In previous crankshafts there is such a large mass of metal in the cheek plates that, when hardened by induction heating, the shoulder adjacent the fillet or adjacent an undercut between the pin and the cheek plate will not be heated enough to harden properly.

It is an object of this invention therefore to provide a journal and a shoulder in which the surface of the shoulder may be evenly hardened by induction heating to the line of its intersection by an extension of the surface of the journal.

This object is obtained by adding a secondary shoulder which extends radially outwardly of the journal a distance slightly less than the diameter of a needle bearing and has its face spaced from associated metal masses such as cheek plates and the like by an intervening small mass of metal.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
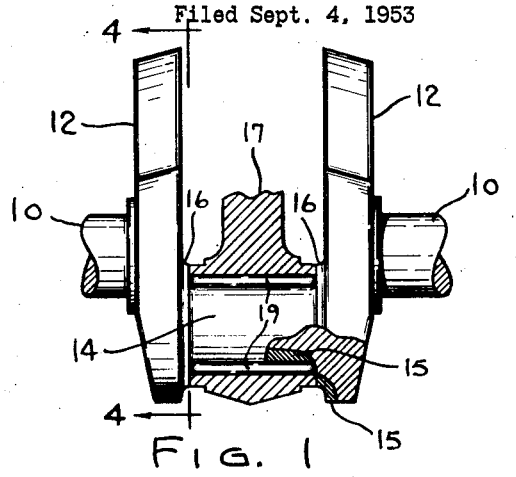
Fig. 1 is a view in side elevation of a crankshaft of standard construction for a connecting rod and needle bearing, with parts broken away and shown in section to illustrate the unhardened needle end engaging shoulder.
Figure 2:
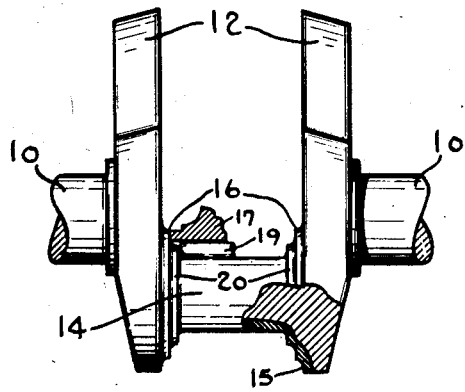
Fig. 2 is a view in side elevation of a crankshaft embodying the present invention, with part shown in section.
Figure 3:
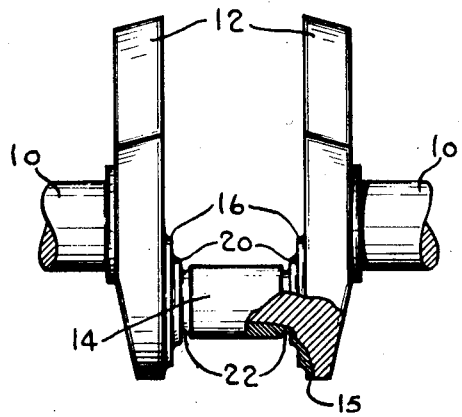
Fig. 3 is a view in side elevation of a crankshaft embodying a modification of the invention.
Figure 4:
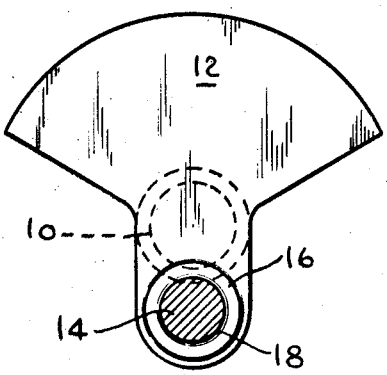
Fig. 4 is a sectional line view taken on the line 4—4 of Fig. 1.

Referring to the drawings, there is disclosed in Figs. 1 and 4 a standard form of crankshaft having a main bearing 10 connected by cheek plates 12 to a crankpin 14. There are customary shoulders 16 between the pin and cheek plate and fillets 18 between the pin 14 and the shoulders 16. A connecting rod 17 has needle bearings 19 with their ends in sliding engagement with the faces of shoulders 16. In hardening the pin 14 and shoulders 16 by the induction process, so much heat is transferred from the shoulders 16 at their surface adjacent the pin 14 that such surface is not properly heated and thus is not hardened as illustrated by the shaded areas 15. Consequently the needle bearings quickly wear the shoulder.

To prevent such detrimental transfer of heat there is interposed between the pin 14 and each shoulder 16 a connecting mass of metal in the form of a secondary shoulder 20 which has its outer cylindrical surface extending beyond the pin 14 a distance somewhat less than the diameter of the bearing needles 19. The inner face of the shoulder 20 is spaced enough from the cheek plate and standard shoulder 16 to prevent undue transfer of heat from such face, and thus it will properly harden all the way to the line made by extending the surface of the pin 14 as indicated by the shaded areas 15.

There may be the usual fillet between the pin 14 and the shoulders 20 or an undercut 22 may be used to advantage in place of the fillet. As the surface of the pin 14 and inner face of shoulder 20 are hardened by the induction process, the transfer of heat from such face will not be great enough to prevent the proper hardening.

I claim:

1. A crankshaft having a cheek plate, a crankpin connected to said plate, a shoulder between said crankpin and said plate, and a connecting portion between said pin and said shoulder having an inner face forming a bearing for the ends of needle bearings, said inner face being spaced from said shoulder enough to prevent transfer to said cheek plate of heat induced in said pin and said inner face in amounts which will result in improper hardening of said shoulder.

2. The method of induction hardening a crankpin connected to a large mass arm and including a surface adjacent said crankpin for providing a bearing for the ends of needle bearings comprising forming a secondary shoulder between said pin and said arm large enough to provide such surface and spaced far enough from said arm to restrict heat absorption from said pin and surface to an amount undetrimental to proper heating for hardening purposes.

3. In a journal, a cheek plate, a primary shoulder on said plate, a secondary shoulder on said primary shoulder, and a crankpin extending from said secondary shoulder, said secondary shoulder having a bearing surface for the ends of needle bearings, said bearing surface being spaced from said cheek plate and primary shoulder to prevent undue transfer of heat induced therein to said cheek plate and said primary shoulder so that said pin and bearing surface will properly harden.

References Cited in the file of this patent

UNITED STATES PATENTS

| 2,145,864 | Denneen et al. | Feb. 7, 1939 |
| 2,293,048 | Denneen et al. | Aug. 18, 1942 |